Dec. 5, 1972   G. R. JOHNSON   3,705,062
METHOD OF ASSEMBLING A COLLAPSIBLE, REUSEABLE CONTAINER
UTILIZING AN INVERTED THREE SIDED PYRAMIDAL SHAPED
TROUGH SUPPORT FIXTURE
Filed Nov. 27, 1970   2 Sheets-Sheet 1

INVENTOR.
GEORGE R. JOHNSON
BY
Baldwin, Egan, Walling & Fetzer
ATTORNEYS

*INVENTOR.*
GEORGE R. JOHNSON
BY

*Baldwin, Egan, Walling & Fetzer*
ATTORNEYS

United States Patent Office 3,705,062
Patented Dec. 5, 1972

3,705,062
METHOD OF ASSEMBLING A COLLAPSIBLE, REUSEABLE CONTAINER UTILIZING AN INVERTED THREE SIDED PYRAMIDAL SHAPED TROUGH SUPPORT FIXTURE
George R. Johnson, Chagrin Falls, Ohio, assignor to The Arpax Company, Chagrin Falls, Ohio
Continuation-in-part of application Ser. No. 779,425, Nov. 27, 1968, now Patent No. 3,599,822. This application Nov. 27, 1970, Ser. No. 93,110
Int. Cl. B29c 27/18; B65g 7/28
U.S. Cl. 156—69                                    6 Claims

ABSTRACT OF THE DISCLOSURE

A method of assembling a collapsible reuseable container for shipping, storage or the like comprised of separate defining side, end and top and bottom panels, comprising utilizing an inverted three sided pyramidal shaped trough fixture and assembling the side, end and bottom panels in the support trough, with the bottom panel facing generally upwardly, applying pressure sensitive tape sections or strips to the bottom panel adjacent opposite corner portions thereof, and in manner whereby the strips extend diagonally across the respective side and end panels and into wrap-around relation with the respective opposite side and end panels to secure the panels together, and then rotating the assembled panels 90° in the fixture to provide positioning of the container for application of the strips or the tape sections to the bottom panel adjacent the other corner portions thereof, whereby the panels are strongly secured together. The assembled container is then placed upright, ready to receive stock material therein. The cover or top panel can then be applied to the filled container and secured to the remainder of the container by tape sections applied adjacent the corners of the top panel and extending diagonally into adhering engagement with the adjacent side and end panels.

---

This application is a continuation-in-part of application Ser. No. 779,425, filed Nov. 27, 1968, now U.S. Pat. No. 3,599,822.

This invention relates in general to a method of assembling a collapsible reuseable container which can be utilized for shipping storage or the like and to a novel support fixture for expeditiously accomplishing such assembly, and more particularly relates to a novel method of assembling such a container utilizing a three sided inverted pyramidal-like trough fixture which facilitates the application in a novel manner of tape sections to the bottom and adjacent side and end panels of the container, and in a manner providing for the effective securement of the panels together into a high strength container arrangement.

BACKGROUND OF THE INVENTION

In U.S. patent application Ser. No. 779,425, filed Nov. 27, 1968 in the name of George R. Johnson and entitled Knock-Down Container, and issued Aug. 17, 1971 as U.S. Patent 3,599,822, there is disclosed a reuseable knock-down type container which can be readily assembled and disassembled for use in the shipping, storage or the like of goods. Such container is formed of a plurality of panels with each of the panels having unitary means on the periphery thereof, for interlocking coaction with said means on the adjacent panels in the assembled condition of the container, and sections of pressure sensitive strapping tape are used to maintain the container panels in assembled relation.

The assembly of such type of container and application of the strips of tape to the container necessitates considerable turning of the container and expenditure of considerable time by a workman so as to apply the tape to the panels thereof for holding or tying the latter together.

SUMMARY OF THE INVENTION

The present invention provides a novel method of assembling a collapsible reuseable container, and application of tape strips thereto, utilizing a three sided inverted pyramidal-like trough fixture, and which materially expedites the assembly procedure and facilitates the production of the assembled containers.

Accordingly, an object of the invention is to provide a novel method of assembling collapsible reuseable containers for stock items and materials.

Another object of the invention is to provide a novel method of assembling a collapsible reuseable container of panel construction, utilizing a fixture comprising an inverted three-sided pyramid-like support trough, with each side of the pyramid-like trough being formed of a right-angle isosceles triangle, and mounting the panels of the container in the fixture for securing such panels together by means of pressure-sensitive tape sections, and in a manner wherein the panels are expeditiously exposed for application of the pressure sensitive tape sections in holding coaction with the panels, to maintain a high strength assembled container.

A still further object of the invention is to provide a novel method of the above described type, which includes temporary application of a holding force to the assembled panels of the container, to maintain the assembly thereof for application of the aforementioned tape sections, and wherein such temporary force is applied in a generally vertical direction along a line passing through opposing corners of the container.

Another object of the invention is to provide a method of the above described type, which includes rotating the container approximately ninety degrees after application of two tape sections thereto, to position the container for application of two further tape sections thereto, to complete the positive securing of the panels of the container together, and then inverting the container to upright position for receiving stock material therein.

Another object of the invention is to provide a method of the aforediscussed type, which includes the positioning of a top panel onto the formed container after the container is filled with stock, and securing of the top panel to the side and end panels of the container by tape sections.

Other objects and advantages of the invention will be apparent from the following description taken in conjunction with the accompanying drawings wherein:

DESCRIPTION OF THE PREFERRED EMBODIMENTS

Figure 1:
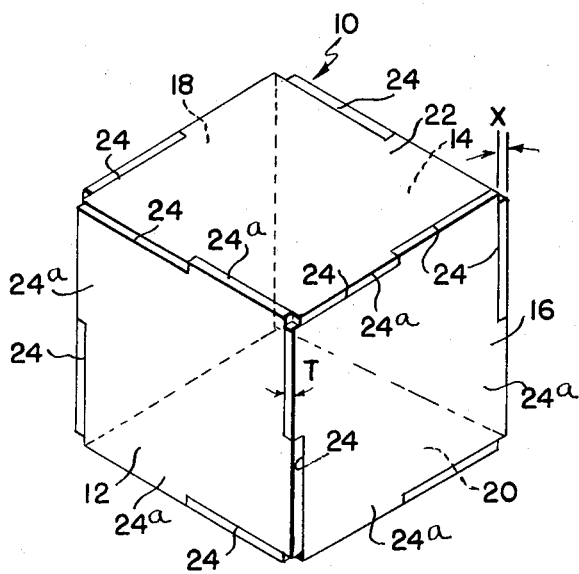
FIG. 1 is a perspective illustration of a collapsible container of the type which may be assembled by the method of the present invention.

Referring now again to the drawings, there is illustrated in FIG. 1 a collapsible, reuseable container 10 of the type which may be expeditiously assembled utilizing the method and fixture of the present invention. The knockdown container 10 is of rectangular or cube-like configuration, comprising side panels 12 and 14, end panels 16 and 18, bottom panel 20, and a top closure panel 22, all of such panels being of generally identical size and configuration.

All of the panels are preferably of generally identical thickness T and may be formed of any suitable, relatively economical material, such as, for instance, pressed hardboard or plywood or plastic, or any other suitable material which is preferably of relatively low cost and of generally rigid construction. While for most purposes the panels should be of generally rigid solid construction, in certain instances and for certain purposes the panels may be formed of cardboard paper or the like, which has a certain amount of rigidity and strength, and which may be constructed so as to have a corrugated interior filler portion with air spaces therein rather than being of a solid material.

The panels can be simply and economically formed with the periphery of each of the panels being recessed along approximately one-half of the length of each peripheral edge and as at 24, for forming recessed portions. The depth X of each recess portion is an amount corresponding substantially to the thickness T of the respective panel. Such recess portion on each edge of each panel results in a tab or shoulder portion 24a extending in the plane of the respective panel along the remainder of the periphery of the respective panel edge. In other words, the length of each recess portion 24 is substantially the overall length of the respective edge of the respective panel divided by two. As can be seen from FIG. 1, the recess portions and the tab portions on opposite edges of each panel are diagonally opposed with respect to one another.

As can be seen in FIG. 1, when the panels are in assembled relationship, the shoulders 24a on each panel are received in the confronting recess portions 24 of the adjacent panels, thus resulting in interlocking of the panels together in directions longitudinally, vertically and transverse of the assembled container. Thus a high strength, rigid, relatively light-weight container is provided which is suitable for receiving relatively heavy stock therein without deformation of the container, and yet a container which can be readily assembled into container form and can be readily disassembled into a flat, knock-down package for convenient storage and/or return of the knock-down package to the source from whence the container originated. Reference may be had to the aforementioned U.S. patent application Ser. No. 779,425, for a more detailed description of the container of FIG. 1 and its assembly and disassembly, and the coaction of the tab and recess means on the peripheral edges of the panels of the container for interlocking the container panels together.

Figure 2:
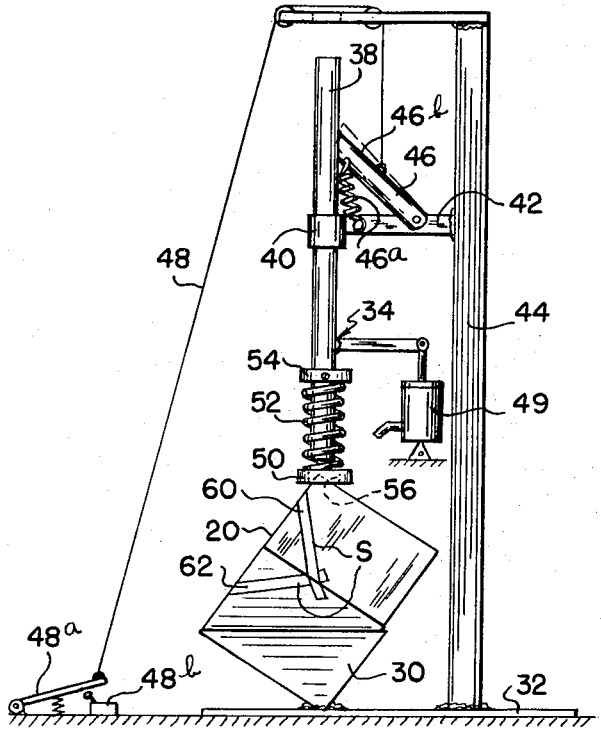
FIG. 2 is a side elevational view of a fixture constructed in accordance with the invention, and illustrating a collapsible container supported in the inverted pyramidal-like support trough thereof, and held therein by means of vertical force applying means on the fixture, and with two tape sections having been applied to the container to partially secure the side, end and bottom panels of the container together.
Figure 4:
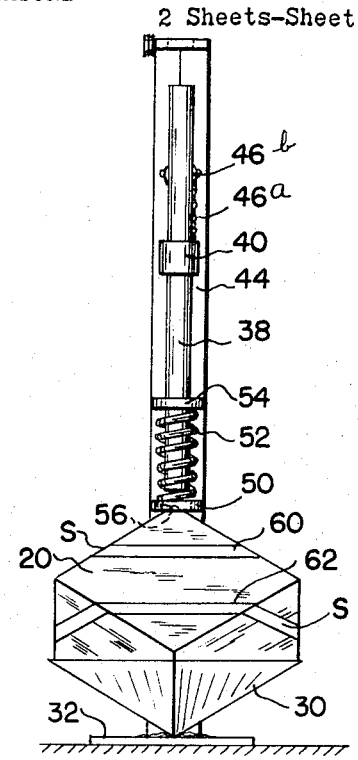
FIG. 4 is a front elevational view of the fixture and container of FIG. 2.
Figure 3:
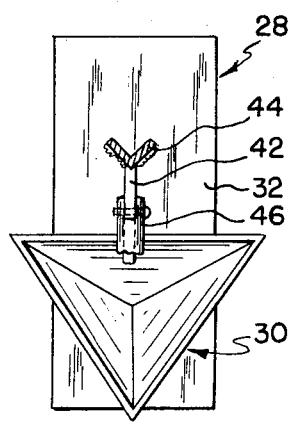
FIG. 3 is a broken, top plan view of the fixture of FIG. 1 with the container removed therefrom in the interests of more clearly showing the inverted pyramidal-like trough support of the fixture.

Referring now to FIGS. 2, 3 and 4, there is illustrated a novel fixture 28 that greatly facilitates the application of the tape sections S to the container, which tape sections are adapted to tie the panels of the container together in assembled relationship, during handling of the container. Such fixture 28 comprises a positioning on support trough 30 mounted on a base 32, and with a force applying mechanism 34 being positioned above the trough, for vertical application of a force to the assembled container panels, for holding the container panels tightly together during application of the tape sections to the container.

Trough 30 comprises an inverted three sided, pyramidal-like support member, with each side being formed of a right angle isosceles triangle, with such sides being joined together to form the trough. As can be seen in FIGS. 2 and 3, the right angles of the sides of the trough abut at the lower end of the trough, and thus orient the container on one of its corners, in a manner wherein diametrically opposite corners of the container are disposed substantially along a vertical line passing through such opposite corners and generally passing thorugh the lengthwise axis of the force-applying mechanism 34. Moreover, the bottom panel 20 of the container is oriented so as to face generally upwardly and with exposure of the junctions of both side and end panels of the container.

The force-applying mechanism 34 in the embodiment illustrated comprises a vertically movable column 38 which is movable downwardly preferably by gravity and through a guiding bearing collar 40 supported on horizontal arm 42, which is secured to vertically extending post 44 mounted on the base support 32. Braking mechanism 46 is provided which may be urged into actuated position by means of spring 46a. Mechanism 46 comprises a pivotal arm 46b adapted to engage the vertically movable column 38 and hold it in position. Upward movement of the arm away from engagement with the column 38, as by means of foot actuated linkage 48, will cause the column to move by gravity downwardly toward the trough 30. Foot actuated mechanism 48a of linkage 48 may coact with a switch 48b to actuate a fluid powered motor unit 49 (FIG. 2) operatively coupled to column 38, for causing upward movement of the latter upon release of brake mechanism 46. Pivotal movement of the arm 46b into engagement with the column 38 will hold the latter against downward movement and in whatever position it is in when engagement of the arm with the column occurs.

Adjacent the lower or distal end of the column 38, there is provided an engaging head 50, which is adapted to engage an underlying container and hold the panels of the container tightly together preparatory to application of the tape sections S to the panels of the container. In the embodiment illustrated, the head 50 is mounted on the column 38 by means of a resilient spring member 52 secured at one end thereof to head 50 and secured at its other end to a collar 54, which in turn is preferably adjustably secured to the column 38. Head 50 preferably has a central circular opening 56 formed therein in which is received the confronting corner of the container, and since the head is movably mounted by means of the resilient spring 52 with respect to the column 38, the head 50 will adjust to the position of the coacting corner of the container and apply adequate force to the container to hold the panels thereof in assembled relationship, preparatory to application of the tape sections S to the container panels.

The container panels are assembled into the trough 30 with the tabs 24a on each of the panels positioned into the corresponding recess 24 in the adjacent panels, and with the bottom panel 20 of the container facing generally upwardly and with the top of the container being open, with the open top facing generally downwardly or, in other words, without application of the top panel 22 to the assembly. The trough 30 is of such height that the side and end panels of the assembled container are exposed sufficiently for application of the tape sections S thereto in a manner to secure the panels together as will be hereinafter described.

Figure 5:
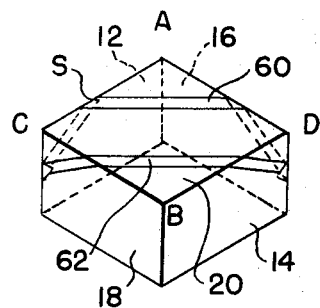
FIG. 5 is a view of the container as positioned in the fixture and generally similar to that of FIG. 4, showing the application of the aforementioned two tape sections thereto adjacent opposite corners of the bottom panel of the container, for securing the bottom, side and end panels of the container together.
Figure 6:
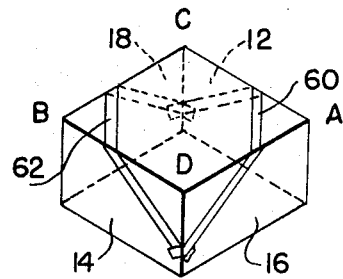
FIG. 6 is a view of the container of FIG. 5 after having been rotated with respect to the support trough of the fixture generally ninety degrees, to position the other corners of the bottom panel of the container for expeditious application of tape sections thereto, for holding the container panels in assembled condition.

With the container panels assembled as afore set forth in the trough 30 and held tightly together by means of the force-applying mechanism 34, and the weight of the container panels in the trough, tape sections 60, 62 are applied to the container and in a manner to engage the bottom, end and side panels of the container, to hold the container panels together in assembled relationship. Tape section 60, as can be seen in FIG. 5, is applied adjacent the corner of the bottom panel 20 of the assembled container and tape section 62 is applied adjacent the corner portion B of the bottom panel 20 of the assembled container, with tape section 60 being of such length that it extends across the bottom panel and down each side of the adjacent end and side panels (16 and 12 respectively), and then terminates with a relatively small wrap around at the other respective side and end panels 14 and 18 respectively, thus securing all of the panels together. Tape section 62 extends across bottom panel 20 adjacent corner portion B (FIGS. 5 and 6) and down each side of the adjacent side and end panels 14 and 18 respectively to terminate in a small wrap around at the other respective end and side panels 16 and 12 respectively. Tape sections 60, 62 are preferably pressure-sensitive, high-strength commercially available filament or strapping tape, so that the tape sections can be rapidly and expeditiously applied by a workman to the container panels. It will be seen that both corners A and B of the assembled container and the adjacent side and end panels are conveniently accessible to the workman for applying the tape sections thereto.

After application of the tape sections 60, 62 to the assembled container panels, the force-applying mechanism 34 is raised and the braking mechanism 46 holds the force-applying mechanism in raised condition. The operator can then manually rotate the container approximately ninety degrees and reposition it in the trough 30 so that corner portions C and D and the adjacent side and end panel junctures of the container become readily accessible for application of tape sections 64 and 66 thereto.

Figure 7:
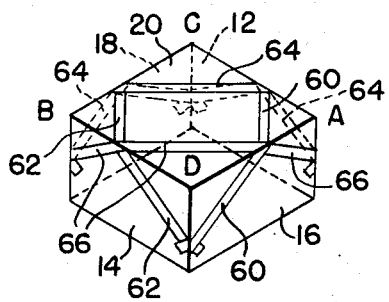
FIG. 7 is a view of the container similar to FIG. 6 and showing the application of the two other tape sections thereto adjacent opposite corners of the bottom panel of the container for tying the container panels together in high strength, assembled condition.

Tape sections 64, 66 are preferably of approximately the same length as aforementioned tape sections 60 and 62, and extend across the bottom panel 20 adjacent the respective corner portions C and D thereof, and down along and across the adjacent side and end panels, and wrap around the opposite side and end panels to terminate thereon, and as generally shown in FIG. 7, thus tying the bottom side and end panels of the assembled container tightly together into a high strength relationship. It will be seen from FIG. 7 that the tape sections 64, 66 cross the tape sections 60, 62 with the ends of the tape sections 64 and 66 generally meeting or being disposed in adjacent relationship adjacent a side edge of the respective container.

Figure 8:
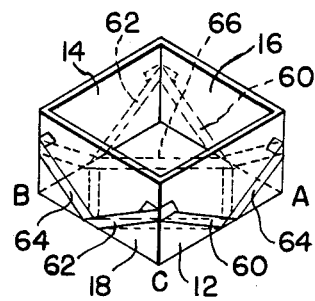
FIG. 8 is a view of the container of FIG. 7, with the four tape sections applied thereto and having been inverted into upright position so that the open top of the container is accessible for placing of stock material therein.

The operator can then once again actuate the linkage mechanism 48 to cause upward movement of the force-applying means 34. The operator can then remove the assembled and taped container from the holding trough 30 and invert the container to expose the open top thereof, as for instance as shown in FIG. 8.

Figure 9:
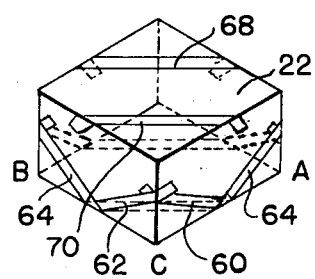
FIG. 9 is a view of the container of FIG. 8 and illustrating a top panel applied to the open top of the container and tape sections applied to the top panel to secure the top panel to the adjacent end and side panels of the container, preparatory to shipment of the container with its load of stock therein.

Stock material can then be inserted into the container through the open top thereof and the top cover panel 22 can be placed on the container with the tabs 24a thereon received into the associated recesses 24 in the adjacent side and end panels of the container. Tape sections 68, 70 may then be applied to the top cover panel 22 adjacent opposite corner portions thereof such as for instance shown in FIG. 9, so as to extend completely across the top panel 22 and down into adhering engagement with the adjacent side and end panels. It will be seen that the tape sections 68, 70 are of a lesser length as compared to the aforementioned tape sections 60, 62, 64 and 66. The container is thus in assembled, high strength, closed condition for shipment of the container and the stock material therein to the point of use. At the situs of use, the container can be opened by ready removal of the tape sections 68, 70 and the stock material may be readily removed from the open-topped container. After being emptied, the container can be easily knocked down by removal of the tape sections 60, 62, 64 and 66, to collapse the container panels after which they can be stacked in flat, superimposed condition and bound together for return to their point of origin for convenient reuse.

The method and associated fixture of the invention has been found to materially increase production in the assembly of knock-down containers and provide an arrangement whereby the container panels can be held in a high-strength relationship by means of the tape sections and formed into usable containers for holding stock material for shipment to a desired location, and wherein the containers can be readily knocked down by merely stripping off the tape sections from the panels and stacking the container panels in flat, superimposed condition for return to the point of origin.

From the foregoing description and accompanying drawings, it will be seen that the invention provides a novel method and associated fixture for assembling collapsible, reusable containers, and in a manner wherein the panels of the container are held in assembled condition and by tape sections can be expeditiously applied thereto to tightly hold the panels in high strength relationship, and wherein the held position of the container in the fixture, the tape sections can be rapidly and expeditiously applied by a workman, making the containers.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a method of assembling a collapsible reuseable container for use in shipping, storage or the like and comprising separate defining side, end and top and bottom panels, each of said panels being of generally identical size and configuration and having unitary means on the periphery thereof adapted for interlocking coaction with said means on the adjacent panels in the assembled condition of said container, comprising the steps of providing a three-sided inverted pyramidal-like trough support fixture, assembling said bottom side and end panels in said fixture into an open box like configuration whereby the container is positioned on one corner portion thereof with the open top of said container facing generally downwardly and the bottom panel of said container facing generally upwardly, applying strips of adhesive securing means to the bottom, side and end panels commencing on the bottom panel adjacent opposite corner portions thereof and so as to extend diagonally across the adjacent side and end panels and wrap around the junctures of the other side and end panels, rotating said container with respect to said fixture approximately 90° to reposition the container on another corner portion thereof and in said fixture and with the bottom panel facing generally upwardly and the open top of the container facing generally downwardly, and applying strips of adhesive securing means to the bottom, side and end panels commencing adjacent the other opposite corner portions of said bottom panel so as to extend diagonally across the adjacent side and end panels and wrap around the junctures of the other side and end panels, whereby the bottom side and end panels securely tied together, and including applying a generally vertical holding force to the corner portion of the container opposite the first mentioned corner portion thereof to hold the panels in firmly interlocked relation during application of the first mentioned strips of securing means to the panels, releasing said vertical holding force prior to said rotating of said container and after application of said first mentioned strips of securing means to the panels, and then reapplying said vertical holding force after said rotating and prior to application of the second mentioned strips of securing means to the panels, then releasing said vertical holding force after application of said second mentioned strips of securing means to the panels, and then removing the container from the fixture.

2. A method in accordance with claim 1 including placing the container on its bottom panel with the open top facing upwardly upon said removal of the container from said fixture.

3. A method in accordance with claim 2 including asembling the top panel on the open top of the container after said removal from said fixture and after filling of the container with stock, and then applying securing means to the top panel to fasten the top panel to the side and end panels of the container.

4. A method in accordance with claim 3 wherein the top panel is fastened to the side and end panels of the container by means of pressure sensitive tape sections placed diagonally on said top panel adjacent opposite corner portions thereof and extending down the adjacent side and end panels.

5. A method in accordance with claim 1 wherein said unitary means on the periphery of each panel comprises a peripheral recess portion on each edge portion of each panel extending lengthwise along said edge portion a distance of approximately one-half the corresponding dimension of said panel, said recess portion partially defining a peripheral tab portion on the respective edge portion extending for the remainder of the distance of extension of said edge portion, and including the step during assembly of the panels in said fixture of inserting the tab portion on one panel into the recess portion of the adjacent panel to interlock the panels together prior to applying said securing means to the panels.

6. A method in accordance with claim 1 wherein the area of each side of said trough support fixture is less than the area of one of said panels, whereby substantial portions of the exterior surfaces of said side and end panels in said fixture are accessible for application of said strips of adhesive securing means thereto.

References Cited

UNITED STATES PATENTS

| | | | |
|---|---|---|---|
| 2,057,942 | 10/1936 | Fay | 217—65 UX |
| 2,079,330 | 5/1937 | Norinsberg et al. | 217—12 |
| 2,674,555 | 4/1954 | Pahl et al. | 206—59 |
| 2,558,591 | 6/1951 | Starck | 217—65 UX |
| 2,197,598 | 4/1940 | Way | 217—69 X |
| 3,414,152 | 12/1968 | Overton | 217—69 X |
| 2,005,159 | 6/1935 | Osgood | 217—12 |
| 2,804,892 | 9/1957 | Peterson | 269—254 X |
| 2,893,275 | 7/1959 | Lindemann | 269—254 X |

FOREIGN PATENTS

| | | | |
|---|---|---|---|
| 239,677 | 10/1959 | Australia | 217—65 |
| 885,051 | 12/1961 | Great Britain | 217—65 |

WILLIAM D. MARTIN, Primary Examiner

B. D. PIANALTO, Assistant Examiner

U.S. Cl. X.R.

29—559; 156—212, 538; 217—12 R, 13, 65, 69; 269—57, 254 R